United States Patent [19]

Rexroad

[11] 4,315,115
[45] Feb. 9, 1982

[54] DRAWOUT CIRCUIT INTERRUPTER

[75] Inventor: James O. Rexroad, Beaver, Pa.

[73] Assignee: Westinghouse Electric Corp., Pittsburgh, Pa.

[21] Appl. No.: 122,408

[22] Filed: Feb. 19, 1980

[51] Int. Cl.³ .............................................. H01H 9/20
[52] U.S. Cl. ................................................ 200/50 AA
[58] Field of Search ....................... 200/50 AA, 50 A

[56] References Cited
U.S. PATENT DOCUMENTS

| | | | |
|---|---|---|---|
| 3,804,998 | 4/1974 | Rexroad | 200/50 AA |
| 4,020,301 | 4/1977 | Ericson et al. | 260/50 AA |
| 4,068,287 | 1/1978 | Kruzic | |

Primary Examiner—James R. Scott
Attorney, Agent, or Firm—L. P. Johns

[57] ABSTRACT

A drawout circuit interrupter comprising a multipole circuit breaker movable between connected and disconnected positions of incoming and outgoing terminals with corresponding conductor terminals on spaced bus bars, at least one threaded bolt on the circuit breaker engageable with an aperture of a supporting frame, and the bolt having means for holding the bolt in alignment with the aperture as the circuit breaker moves into the connected position.

5 Claims, 14 Drawing Figures

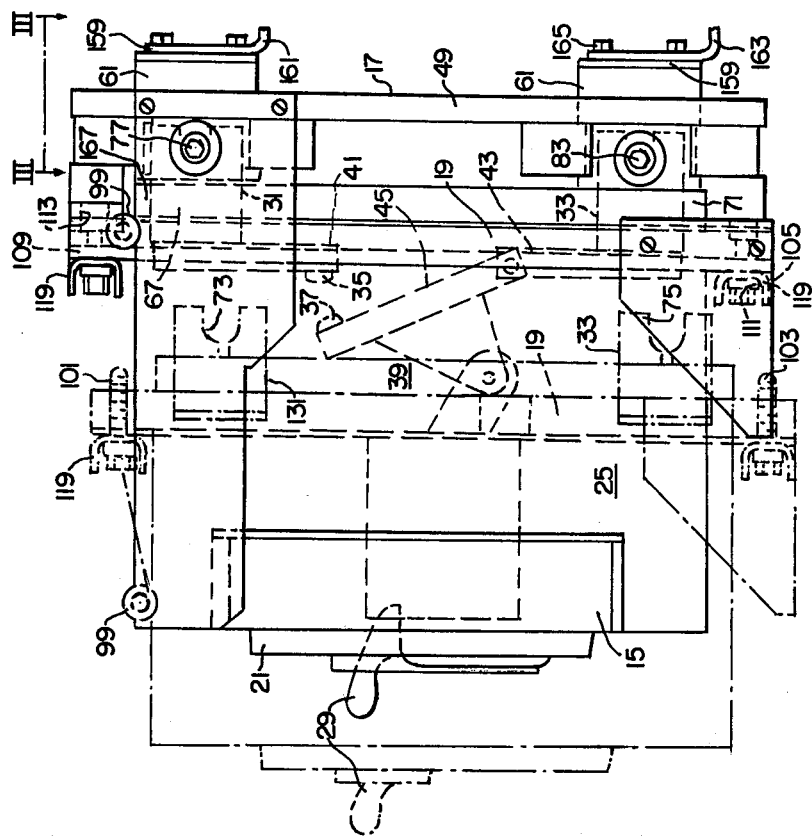
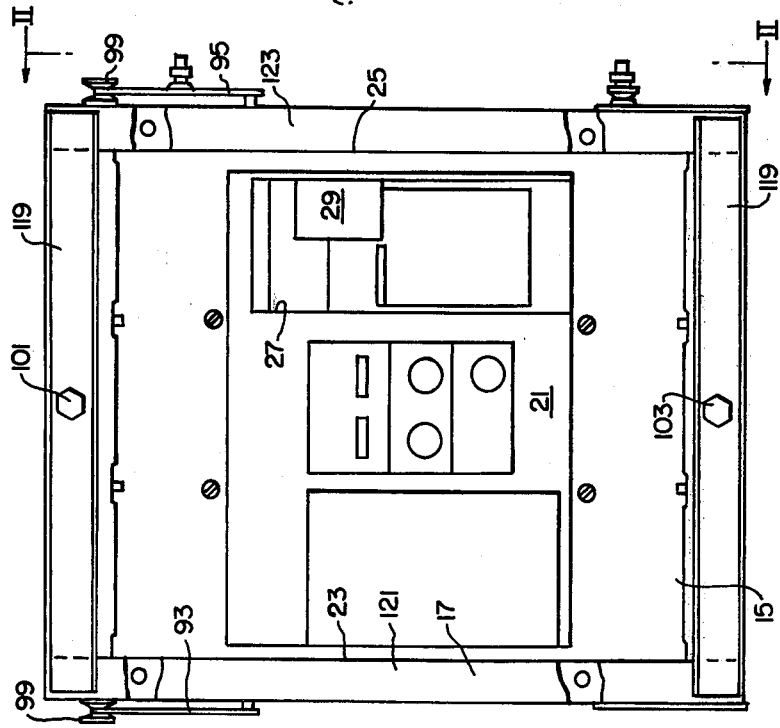

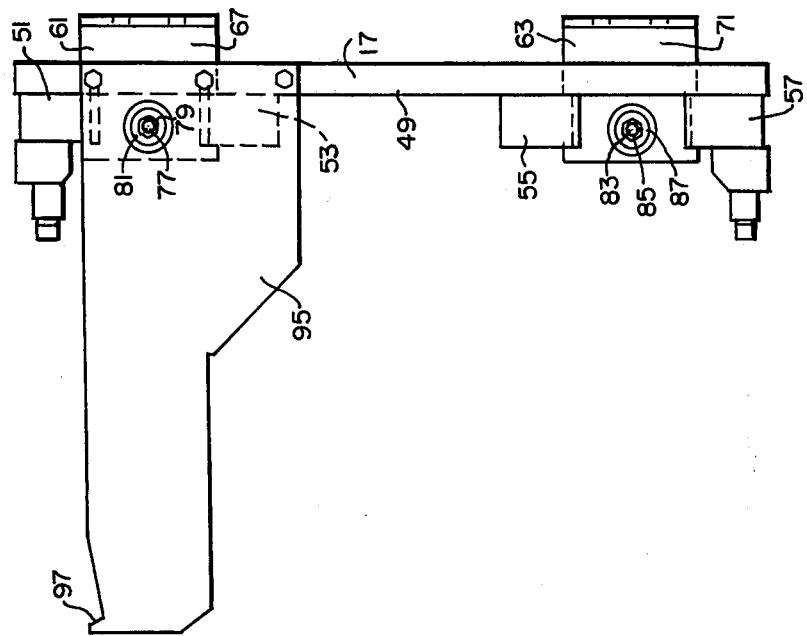
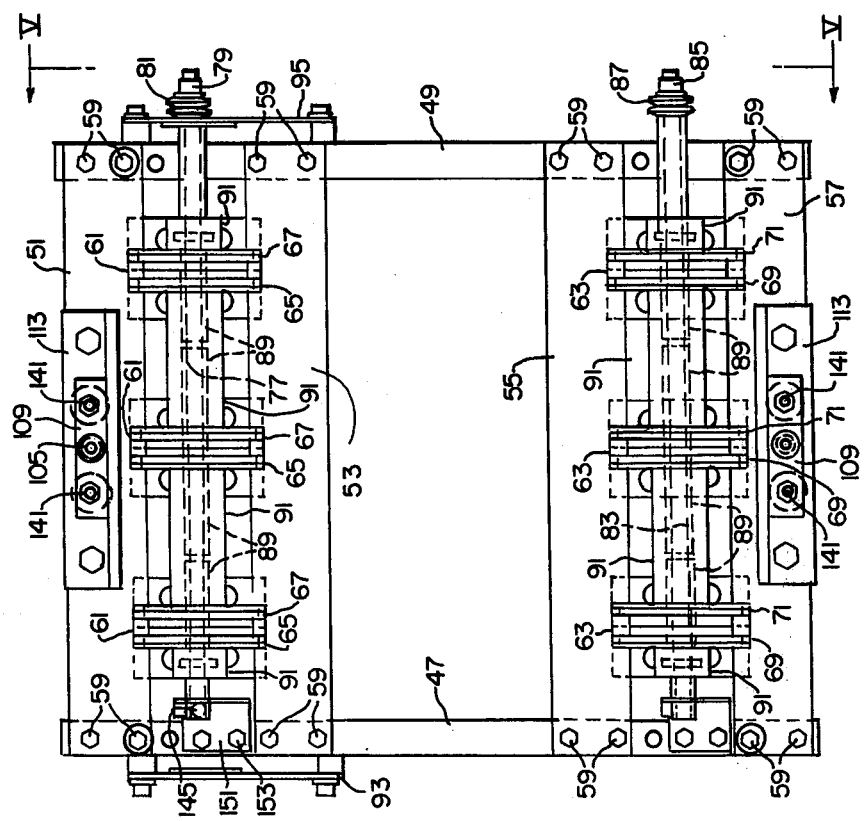

DRAWOUT CIRCUIT INTERRUPTER

BACKGROUND OF THE INVENTION

1. Field of the Invention

This invention relates to drawout switchgear and, more particularly, it pertains to a bolted joint connection between terminals of a circuit breaker and bus conductors to which the circuit breaker is connected.

2. Description of the Prior Art

Circuit breakers having higher ratings, such as the drawout type breaker or metal enclosed switchgear, have multiple connectors on each pole to multiply the number of contacting areas in order to minimize electrical resistance and the resulting heat generated thereby. Various means have been employed for moving circuit breakers into and out of operating positions with respect to terminals of load and line bus conductors, which means have included levering-in means, bolted clamps for holding the terminals and conductors in tight fitting electrical connection, and the like. Generally, U.S. Pat. Nos. 3,804,998, and 4,068,287 disclose mounting and connecting means for drawout circuit breakers.

SUMMARY OF THE INVENTION

It has been found in accordance with this invention that a circuit interrupter structure may be provided which comprises a multipole circuit breaker and spaced bus bars having conductor terminals, the circuit breaker having a back wall, a support frame mounting the conductor terminals, each pole for each circuit breaker including at least two vertically spaced incoming and outgoing terminals extending from the rear wall, the circuit breaker being movable between electrically connected and disconnected positions of the terminals of the circuit breaker and of the spaced bus bars, the conductor terminals and the corresponding incoming and outgoing terminals having overlapping contacting portions, levering-in means for moving the circuit breaker between disconnected and connected positions of the terminals, the means comprising a threaded bolt in the circuit breaker, a bolt receiving aperture in the support frame and having a head and a threaded portion, holding means for holding the bolt in alignment with the aperture as the circuit breaker moves toward the support frame and including resilient means mounted on the bolt and compressed against head and rear wall, the bolt having a head and a threaded portion, holding means for holding the bolt in alignment with the aperture as the circuit breaker moves toward the support frame and including resilient means mounted on the bolt and compressed against the rear wall, the holding means also comprising a spring mounted on the bolt and compressed against the rear wall, and the holding means also comprising a stop means on the bolt on the side of the rear wall opposite the bolt head.

BRIEF DESCRIPTION OF THE DRAWINGS

FIG. 1 is a front elevational view of a circuit breaker within a mounting frame;

FIG. 2 is a vertical sectional view of a circuit breaker taken on the line II—II of FIG. 1;

FIG. 4 is a front elevational view of the mounting frame;

FIG. 5 is a side elevational view taken on the line IV—IV of FIG. 4;

DESCRIPTION OF THE PREFERRED EMBODIMENTS

Figure 3:
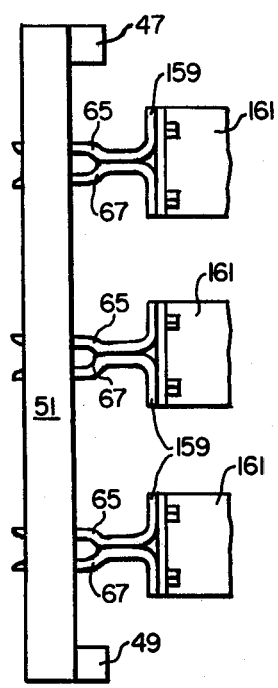
FIG. 3 is a plan view taken on line III—III of FIG. 2.

In FIG. 1 a circuit breaker, generally indicated at 15, is shown mounted on a mounting frame 17. Inasmuch as the circuit breaker 15 is a molded-case type of breaker, such as disclosed in Canadian Pat. No. 693,476, issued Sept. 1, 1964, only a limited description is included herewith. The circuit breaker 15 (FIGS. 1, 2) includes an enclosure comprising back wall 19, a front panel 21, and opposite side walls 23, 25. The front panel 21 includes an opening 27 through which a handle 29 extends.

The circuit breaker 15 is a three-pole type, each pole being provided with incoming and outgoing terminals generally indicated at 31 and 33, respectively. The circuit breaker 15 includes, for each pole unit, a stationary contact 35 and a movable contact 37, the latter of which is actuated by an operating mechanism generally indicated at 39, which is connected to the handle 29. The terminals 31, 33 are connected respectively to stationary conductors 41, 43, respectively, which are secured in the back wall 19. A path of travel of the circuit through the breaker extends from the terminal 31 to the conductor 41, the stationary contact 35, the movable contact 37, a contact arm 45, the conductor 43, and the terminal 33.

The mounting frame 17 (FIGS. 2-5) is a rectangular support structure including spaced vertical frame members 47, 49 and horizontal members 51, 53, 55, 57 which extend between and are attached to the frame member 47, 49 in a suitable manner such as by screws 59. The mounting frame 17 also comprises a bank of incoming terminals 61 (FIG. 4) at the upper end of the mounting frame. Similarly, at the lower end of the mounting frame there are three outgoing terminals 63. The horizontally spaced terminals 61 are mounted on the insulating frame members 51, 53 and the horizontally spaced terminals 63 are mounted on insulating frame members 55, 57. Each of the three separate terminals 61 comprise a pair of spaced conductors 65, 67 (FIG. 3). Likewise, each of the outgoing terminals 63 comprises a pair of similar spaced conductors 69, 71.

Each pair of conductors 65, 67 is spaced by a distance slightly greater than the thickness of the terminals 31

(FIG. 2) and are adapted to receive said terminals when the circuit breaker 15 is completely installed in place. Similarly, the lower conductors 69, 71 are spaced by distances slightly greater than the thickness of the terminals 33 to facilitate easy insertion thereof. The terminals 31 comprise similar aligned notches 73, and the terminals 33 comprise similar aligned notches 75.

Clamping means for tightening the interfitting terminals 31 and conductors 65, 67 as well as for the terminals 33 and conductors 69, 71 are provided for each bank of incoming terminals 61 and outgoing terminals 63. The clamping means for the incoming terminals comprise (FIG. 4) an elongated bolt 77, a nut 79, and a spring washer 81. Similarly, the clamping means for the outgoing terminals 63 comprises an elongated bolt 83, a nut 85, and a spring washer 87. Each bolt 77, 83 is enclosed within similar insulating sleeves 89 which together with the bolts extend through aligned apertures in each bank of terminals, whereby the bolts are retained in place. In addition, the assembly of bolts and insulating sleeves is enclosed within insulating spacers 91 extending between each pair of space terminals 61 and 63. Accordingly, when the terminals 31, 33 are completely inserted into place between the pairs of conductors 65, 67 and 69, 71, the assembly of terminals and conductors are clamped into good electrical, surface-to-surface contact by tightening the nuts 79, 85 on the respective bolts 77, 83. The degree of tightening is dictated by the spring washers 81, 87.

The mounting frame 17 also comprises a pair of side rails 93, 95 (FIGS. 4, 5) which extend outwardly from the frame members 47, 49 respectively. Each rail includes a notch 97, such as shown for the rail 95 (FIG. 5). As shown in FIGS. 1 and 2, when the circuit breaker 15 is installed, a pair of hanger pins or rollers 99, on opposite sides of the circuit breaker, are placed within the notches 97 of side rails 93, 95, thereby enabling alignment of the terminals 31, 33 with corresponding incoming and outgoing terminals 61, 63 as the circuit breaker 15 is moved from the retracted, broken-line position to the completely installed, solid-line position of FIG. 2.

Figure 12:
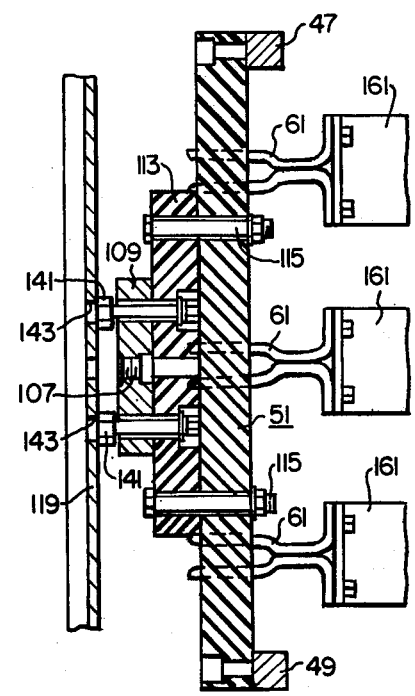
FIG. 12 is a fragmentary horizontal sectional view showing visual means for tightening the levering-in bolts.

In accordance with this invention, the circuit breaker 15 is provided with levering-in means for drawing the circuit breaker terminals 31, 33 into proper positions within the incoming and outgoing terminals 61, 63. For that purpose the levering-in means comprises a pair of bolts 101, 103 (FIGS. 1, 2) extending toward and in alignment with bolt-receiving apertures 105, 107, which are located in spaced plates 109, 111 (FIG. 2). Inasmuch as the plates 109, 111 are metallic, each plate is mounted on an insulating spacer 113, such as shown for the plate 109 (FIG. 12), which spacer in turn is mounted on the support frame member 51 in a suitable manner such as by bolts 115.

Figure 6:
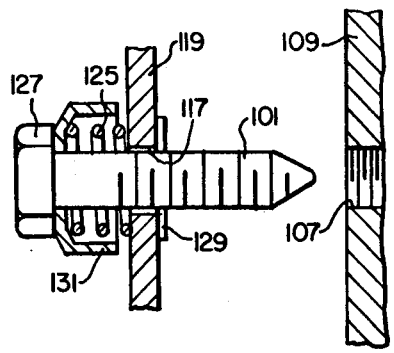
FIG. 6 is an enlarged fragmentary view of a levering-in bolt showing the manner in which it is aligned with a bolt receiving aperture.
Figure 7:
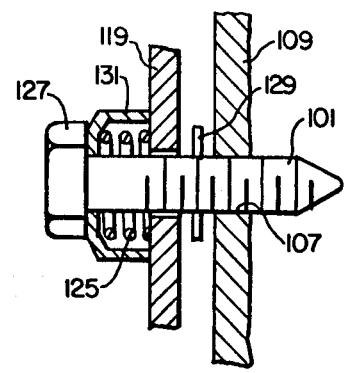
FIG. 7 is an enlarged fragmentary view of the same bolt after tightening in the aperture.

To facilitate insertion of the levering-in bolts 101, 103 into their corresponding apertures 105, 107, each bolt is provided with holding means for maintaining the bolt horizontally in place within an aperture 117 in a horizontal channel 119 such as shown for the bolt 101 in FIG. 6. The channel 119 (FIG. 1) extends between spaced portions 121, 123 of the back wall 19, and each channel 119 may, in the alternative be part of the back wall 19 of the circuit breaker 15. The means for holding the bolt 101 in alignment with the aperture 107 (FIG. 6) comprises flexible means such as a coil spring 125 disposed between the channel 119 and a head 127 of the bolt 101. The means also comprises a projection, such as a pin 129 on the bolt on the side of the channel 119 opposite the spring 125. To maintain the bolt 101 horizontally within the aperture, 117, the spring 125 is in slight compression between the channel 119 and the bolt head 127 holding the pin 129 against the channel. To maintain the spring 125 in place a cup-shaped retainer 131 is disposed between the spring 125 and the bolt head 127. Thus, the assembly of the spring 125, the pin 129 and the retainer 131 retain the bolt 101 in alignment with the aperture 107 as the terminals 31, 33 are moved into engagment with the conductors 61, 63. Thereafter, when the leading edge of the bolt 101 (FIG. 7) the threaded shaft of the bolt is turned into the threaded aperture 107 until the desired position of the breaker (or moving assembly) is obtained, thereby further compressing the spring 125 and moving the pin 129 away from the channel 119.

Figure 8:
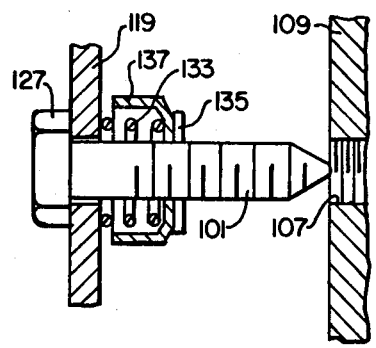
FIG. 8 is an enlarged fragmentary view of another embodiment of the bolt of FIG. 6.
Figure 9:
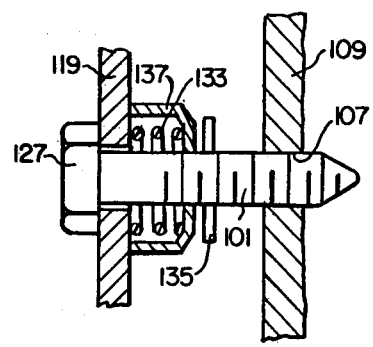
FIG. 9 is an enlarged fragmentary view of the embodiment of FIG. 8 showing the bolt after tightening into an aperture.

Another embodiment of the holding means is shown in FIGS. 8, 9 in which the holding means is provided on the bolt 101 on the side of the channel 119 opposite the bolt head 127. In this embodiment a flexible means such as a coil spring 133 is disposed between a pin 135 and the channel 119 on the side of the channel opposite the bolt head 127. A cup-shaped retainer 137 is located between the spring and the pin. As the threaded bolt 101 is turned in the threaded aperture 107 (FIG. 9) the spring 133 remains in the same compression status as in FIG. 8 because the bolt head 127 is in contact with the channel 119 at all times. When the breaker is backed out or disengaged, the spring is compressed and the bolt head 127 breaks contact with the channel 119.

Figure 10:
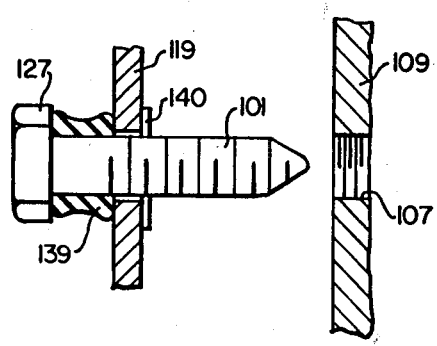
FIG. 10 is an enlarged fragmentary view of another embodiment of a bolt showing the manner in which it is aligned with a bolt receiving aperture.
Figure 11:
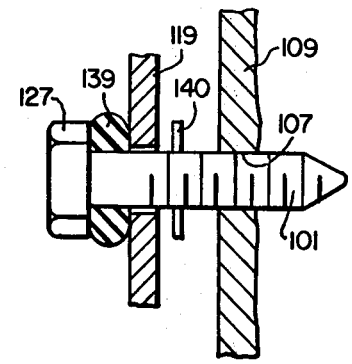
FIG. 11 is an enlarged fragmentary view showing the manner in which the bolt embodiment of FIG. 10 is disposed in the receiving aperture.

Another embodiment of the holding means is shown in FIGS. 10 and 11 and comprises a flexible member, such as a collar 139 of flexible material, such as rubber, around the bolt 101 and between the channel 119 and the bolt head 127 where the collar is under tight compression and holds the pin 140 against the channel 119. As the bolt 101 (FIG. 11) is rotated into the threaded aperture 107, the resilient collar 139 is further compressed, moving the pin 129 away from the retainer 119.

In all of the embodiments of FIGS. 6–11 the bolts may be in alternate positions so that in each embodiment the bolt may be seated in the plate 109 and in aperture corresponding to the threaded aperture 107 provided in the channel 119. In further accordance with this invention, means are provided for determining when the circuit breaker is completely installed with the incoming and outgoing terminals 31, 33, fully installed within the conductors 65, 67, 69, 71. For that purpose (FIG. 12) similar stop means or bolts 141, which are disposed on the plate 109 on the insulating spacer 113, are used for visually determining when the proper amount of pressure is applied to the levering-in bolts 101. The heads of the bolts 141 are aligned with a pair of spaced apertures 143 to enable an operator to visualize the heads of the bolts adjacent to the channel 119 when the draw-in bolts are sufficiently tightened. Moreover, the bolt heads 141 also serve as stop means for further movement of the circuit toward the conductors 65, 67, 69, 71.

Figure 14:
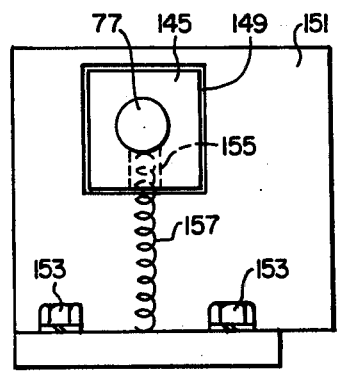
FIG. 14 is an end view taken on the line XIV–XIV.
Figure 13:
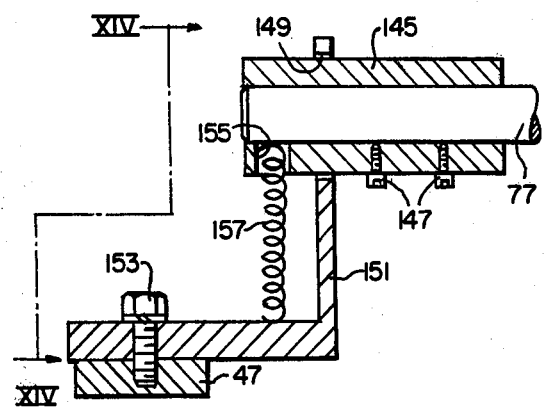
FIG. 13 is an enlarged fragmentary view showing the manner in which one end of a clamping bolt is secured in a non-rotating manner.

This invention also comprises means for grounding the clamping bolts 77, 83. The end portion of the bolt 77 (FIGS. 13, 14) opposite the nut 79 is enclosed within a sleeve 145 where it is retained against rotation by set screws 147, or drive pins. The outer cross section of the sleeve 145 is rectangular and is inserted within a rectangular hole 149 in a mounting bracket 151, which is secured in place on the vertical frame member 47 (FIG. 4) by suitable means such as screws 153. The sleeve 145 comprises an aperture 155 and a coil spring 157 extends between the bracket 151 and through the aperture to contact the end portion of the bolt 77, thereby providing positive grounding means between the bolt and the frame member 47. The frame member 47, in turn, is grounded at another location.

Finally, as shown in FIGS. 2 and 3 the outer end portions of the several conductors 65, 67, 69, 71 have similar outturned end portions 159 by which the conductors 65–71 are connected to corresponding bus bars 161, 163 in a suitable manner such as by bolts 165. The outturned end portions 159 of the conductors are thereby bolted directly to the bus bars and avoid the use of additional conductors or adaptors as in prior constructions.

In conclusion, the device of this invention provides for improvements in construction and operation of a circuit breaker of the type involved over circuit breakers of prior construction.

What is claimed is:

1. A circuit breaker structure comprising a base structure, a movable circuit breaker and spaced bus bars having conductor terminals, the circuit breaker including incoming and outgoing terminals, the circuit breaker being movable between electrically connected and disconnected positions of the terminals of the circuit breaker of the spaced bus bars, the terminals of the spaced bus conductors and of the circuit breaker having overlapping portions and having transverse aligned openings when the circuit breaker is in the connected position, releasable clamping means for holding the overlapping portions of incoming terminals in tight electrical surface-to-surface contact, said clamping means comprising an elongated bolt and nut assembly, the elongated bolt being disposed in the aligned openings, a sleeve being fixedly disposed on the bolt and having a non-circular outer periphery, each sleeve being seated in an aperture of locking inner periphery in said base structure for rotational immobilization of the sleeve, and a grounding conductor in contact with the bolt.

2. The structure of claim 1 in which there are track means for supporting movement of the circuit breaker terminals in alignment with the corresponding bus conductor terminals.

3. The structure of claim 2 in which the grounding conductor is a spring.

4. The structure of claim 3 in which each sleeve includes an aperture and the spring extending into the aperture.

5. The structure of claim 1 in which the incoming and outgoing terminals have outturned end portions adapted for connection to the corresponding conductor terminals of the spaced bus bars.

* * * * *